(12) United States Patent
Armstrong et al.

(10) Patent No.: US 7,599,999 B1
(45) Date of Patent: Oct. 6, 2009

(54) SYSTEM AND METHODOLOGY THAT FACILITATES CLIENT AND SERVER DATA EXCHANGE IN A DISTRIBUTED INDUSTRIAL AUTOMATION ENVIRONMENT

(75) Inventors: Larry Dawson Armstrong, Eastlake, OH (US); Taryl Jon Jasper, South Euclid, OH (US); John Joseph Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 671 days.

(21) Appl. No.: 10/152,513

(22) Filed: May 21, 2002

(51) Int. Cl.
*G06F 15/167* (2006.01)
*G06F 13/28* (2006.01)
(52) U.S. Cl. .................... 709/216; 709/213; 711/147
(58) Field of Classification Search ......... 709/202–203, 709/213, 216, 223–224; 711/147
See application file for complete search history.

(56) References Cited

U.S. PATENT DOCUMENTS

| | | | | |
|---|---|---|---|---|
| 6,061,603 A | * | 5/2000 | Papadopoulos et al. | 700/83 |
| 6,233,626 B1 | * | 5/2001 | Swales et al. | 710/11 |
| 6,411,987 B1 | * | 6/2002 | Steger et al. | 709/203 |
| 2002/0116453 A1 | * | 8/2002 | Todorov et al. | 709/203 |

* cited by examiner

*Primary Examiner*—William C Vaughn, Jr.
*Assistant Examiner*—Peling A Shaw
(74) *Attorney, Agent, or Firm*—Turocy & Watson LLP; William R. Walbrun

(57) ABSTRACT

The present invention relates to a system and methodology providing a multi-protocol data exchange between client and server components in an industrial automation environment. According to one aspect of the present invention, an industrial control system is provided that includes a server application operative to exchange data with an industrial controller. A server component associated with the server application is adapted to communicate via a plurality of protocols to facilitate the data exchange. A host component exposes objects in the server component, wherein the objects can be employed to communicate via a shared memory protocol according to a local operating environment. In addition, the objects can be adapted to communicate via a multicast protocol in accordance with a remote operating environment.

32 Claims, 10 Drawing Sheets

SYSTEM AND METHODOLOGY THAT FACILITATES CLIENT AND SERVER DATA EXCHANGE IN A DISTRIBUTED INDUSTRIAL AUTOMATION ENVIRONMENT

TECHNICAL FIELD

The present invention relates generally to industrial control systems, and more particularly to a system and methodology to facilitate data exchange according to an optimized and dynamic protocol in an industrial automation environment.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Generally, industrial controllers utilize the aforementioned technologies along with other technology to control, cooperate and communicate across multiple and diverse applications.

At the core of the industrial control system, is a logic processor such as a Programmable Logic Controller (PLC). Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Industrial controllers and associated control systems have increasingly become more sophisticated and complicated as control applications have been distributed across the plant floor and in many cases across geographical or physical boundaries. As an example, multiple controllers and/or other devices may communicate and cooperate to control one or more aspects of an overall manufacturing process via a network, whereas other devices may be remotely located, yet still contribute to the same process. In other words, control applications have become less centrally located on a singular control system having associated responsibilities for an entire operation. Thus, distribution of the overall control function and/or process frequently occurs across many control components, systems or devices.

Current control and communications architectures for distributed control and services can include data servers that manage protocol level details, including server applications that deal with name parsing as well as device and network specifics. Many systems abstract these details into a common set of events that an application then must support. For example, current systems often pass items and active states down to the server application, wherein the server application is then responsible for keeping track of what items should be polled and the scheduling of the items. When the server application gets data, it can parse through a buffer and update new values for each item that is active. These values can then be checked against an old value, if the value is different, then data can be sent to the client. Client applications, such as a Human Machine Interfaces (HMI) or other type applications generally connect to the server (e.g., controller acting as a server) and employ specified interfaces to add and remove groups, add and remove items, receive subscriptions and perform reads and writes to an industrial controller, for example.

Unfortunately, the above server architecture is subject to several limitations. First, the above server applications often maintain multiple lists of items and associated states. Thus, these applications often expend valuable bandwidth processing the lists. As an example, some repeated operations can occur for every item on the list. Second, some distributed interfaces do not facilitate scaling up to many client machines. Some specifications enable clients to specify an item handle to notify clients that data has changed. Since this handle is unique for different instances of the client, this can cause servers to build a packet specific to the client and send it to that particular client application. If many clients are connected to a server application, the server might be building packets with the same data and with different item handles. This causes higher processing requirements on the server machine with increased network traffic and can limit the ultimate amount of scalability that a system can have.

A third problem with current architectures is the amount of modularity that is in an application. In many instances, a large application can talk to multiple devices on multiple networks. Thus, there is often no modularity with regards to loading components as they are needed to communicate to a specific device. Still yet another problem involves remote connections between applications. When clients and servers are remote, as in a distributed application scenario, if the connection is broken between machines, calls from clients to servers generally have to timeout before returning to the client—with the timeout often approaching 30 to 40 seconds. This can cause long delays in responsiveness of client applications. Once there has been a disconnection for example, there is generally no automatic reconnection and it is difficult or impossible to establish a given state before the connection between machines was lost.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate optimized data exchange between control components operating in a distributed industrial controller environment. This is achieved by providing distributed components (e.g., toolkits) to respective client and server applications that dynamically select a suitable protocol for data communications based upon the relationship or configuration between the client and server. As an example, a client application can be configured as a Human Machine Interface (HMI) operating in conjunction with a data server that provides access to an industrial controller. If the client and server happen to be operating on a local or similar machine, a first protocol can be selected to optimize data transfers on the local machine. If the client and server happen to be communicating remotely across a network, a second protocol can be selected to facilitate remote data transfers. Thus, issues relating to sending data to multiple clients and/or how timeouts occur over remote connections are addressed via the type of protocol selected. In this manner, data exchanges and interfaces between multiple and distributed control components can be optimized, whereby network and processing bandwidth problems are mitigated.

According to one aspect of the present invention, a shared memory protocol is provided, when the client and server are on the same machine. This protocol can include memory buffers stored in a shared memory, wherein a handle is passed to a client toolkit along with information of offsets and lengths for respective data items. The client toolkit employs the shared memory to build up data packets that it needs to send back to an associated client application. When clients and servers are operative on different machines, a multicast protocol can be provided, wherein a memory buffer can be placed into packets and multicast out to a distributed system. Thus, distributed clients can extract the data off a network and utilize the data as needed. Multicasting data to multiple clients, in contrast to maintaining a plurality of lists as with conventional systems, will facilitate increased network bandwidth and server performance as more clients are added to the system. In addition, this type of data can be multicast as blocks of data to further enhance network bandwidth. Furthermore, multicasting improves scalability when adding additional clients to distributed system architectures.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing a multi-protocol data exchange between client and server components in an industrial automation environment. According to one aspect of the present invention, an industrial control system is provided that includes a server application operative to exchange data with an industrial controller. A server component, such as a server toolkit, associated with the server application is adapted to communicate via a plurality of protocols to facilitate the data exchange. A host component exposes objects in the server component, wherein the objects can be employed to communicate via a shared memory protocol according to a local operating environment. In addition, the objects can be adapted to communicate via a multicast protocol in accordance with a remote operating environment. According to another aspect of the present invention, a client application is provided to exchange data with the industrial controller. A client component, such as a client toolkit, is associated with the client application and can similarly communicate via the plurality of protocols. A connection component operative with the client component can select the shared memory protocol in accordance with the local operating environment and select the multicast protocol in accordance with the remote operating environment.

Figure 1:
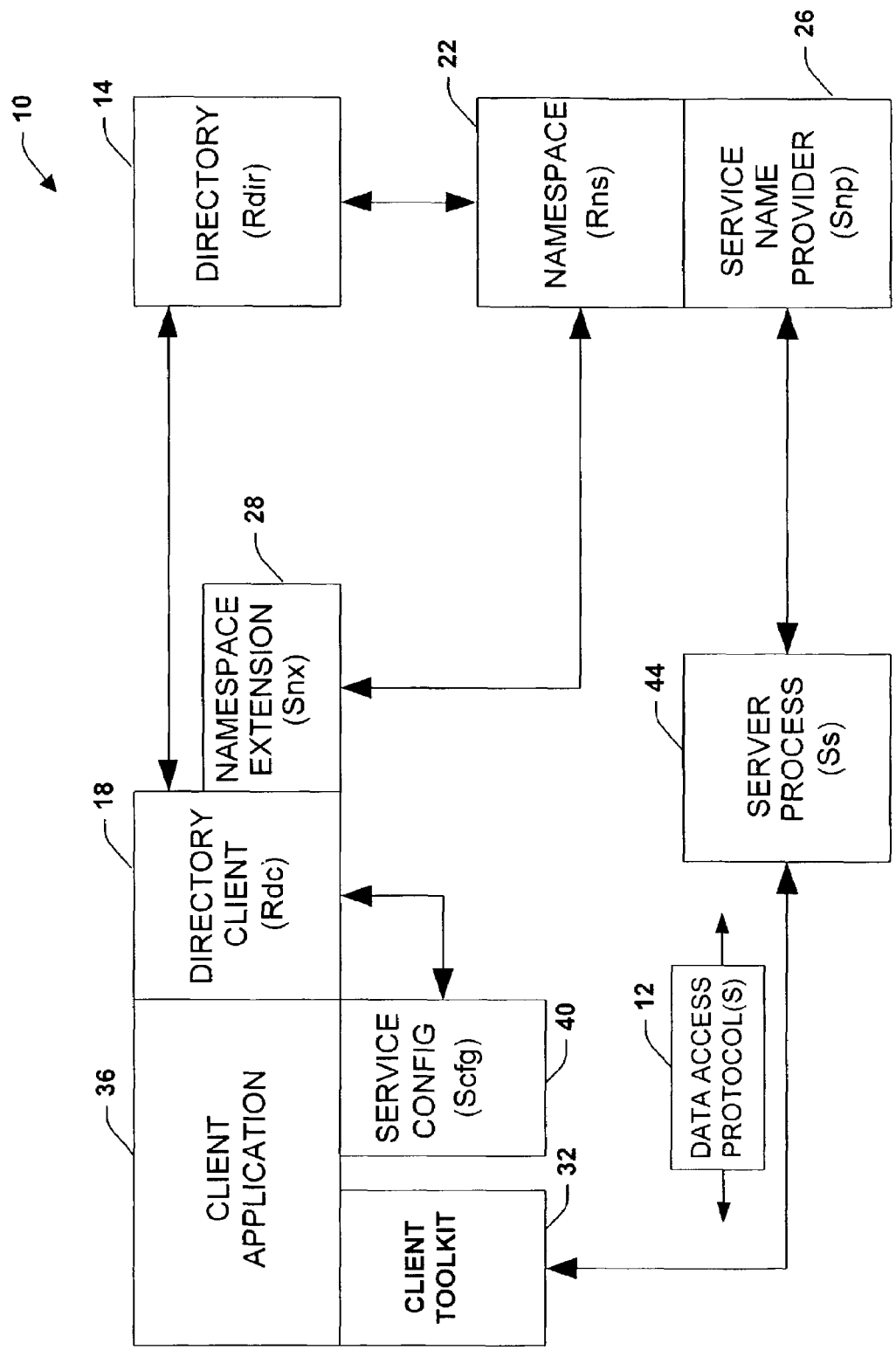
FIG. 1 is a schematic block diagram illustrating a service architecture and data access protocols in accordance with an aspect of the present invention.

Referring initially to FIG. 1, a schematic block diagram illustrates a service architecture 10 that employs one or more data access protocols 12 in accordance with an aspect of the present invention. The service architecture 10 provides an industrial automation model and environment, wherein remote/disparate client and server automation components can interact and cooperate to control an industrial process. The data access protocols 12 are operative to facilitate communications between respective client applications (e.g., HMI interacting with an industrial controller) and server processes (e.g., industrial controller transmitting and receiving requested data). The protocols 12 can include a shared memory protocol for local interactions between clients and servers (e.g., client and servers installed on same machine) and include a multicast protocol for remote or distributed interactions between clients and servers. As will be described in more detail below, other protocols can also be employed. It is noted that nomenclature $R_{xx}$ represents service architecture elements, whereas $S_{xx}$ represents components specific to a service. It is also noted that described component interactions of adjoining components can reside in similar or shared processes. In addition, change notification and redundancy management components can be provided which are not shown.

The service architecture includes a directory 14 ($R_{DIR}$) that provides a persistent store of "globally interesting" or relevant information for one or more control components. The directory 14 includes "Tier" Directory objects which can include Applications, Areas, and Directory Entries, for example. The scope of the directory 14 may be local to a machine or global to a network, for example. A directory client ($R_{DC}$) 18 (e.g., Active Directory Service Interface (ADSI)) interacts with the directory 14 to provide support for access to directory content. The directory client 18 can include service management interfaces for service binding via directory entries and host basic service and namespace extension components.

A namespace server 22 ($R_{NS}$) is provided that aggregates service item names in areas to provide tier two or higher (tiers described below in FIG. 2) service item namespaces. The namespace server 22 generally expects server-specific components implementing a name provider interface and resolves service item names into server connection data. A name provider 26 ($S_{NP}$) extracts service item names from supporting server processes and exposes internal structure of tier service item names. A namespace extension 28 ($S_{NX}$) exposes service item names via ADSI or other interface and can act as a bridge between tier namespace components.

The service architecture 10 also includes a client toolkit 32 that provides client-side Application Program Interface (API). In addition, the client toolkit 32 can manage multiple servers on behalf of a client application 36. A service configuration 40 ($S_{CFG}$) facilitates creating and editing directory areas and entries to expose services and to define servers. A server process 44 ($S_S$) supports service behavior and exposes the behavior to one or more clients 36 via service-specific interfaces, objects and transport mechanisms accessed via the service architecture 10. Thus, the service architecture 10 incorporates multiple perspectives in a client and server environment including logical, physical, and behavioral aspects. These aspects can be permutations of access, computer and service dimensions of the namespace, for example.

Figure 2:
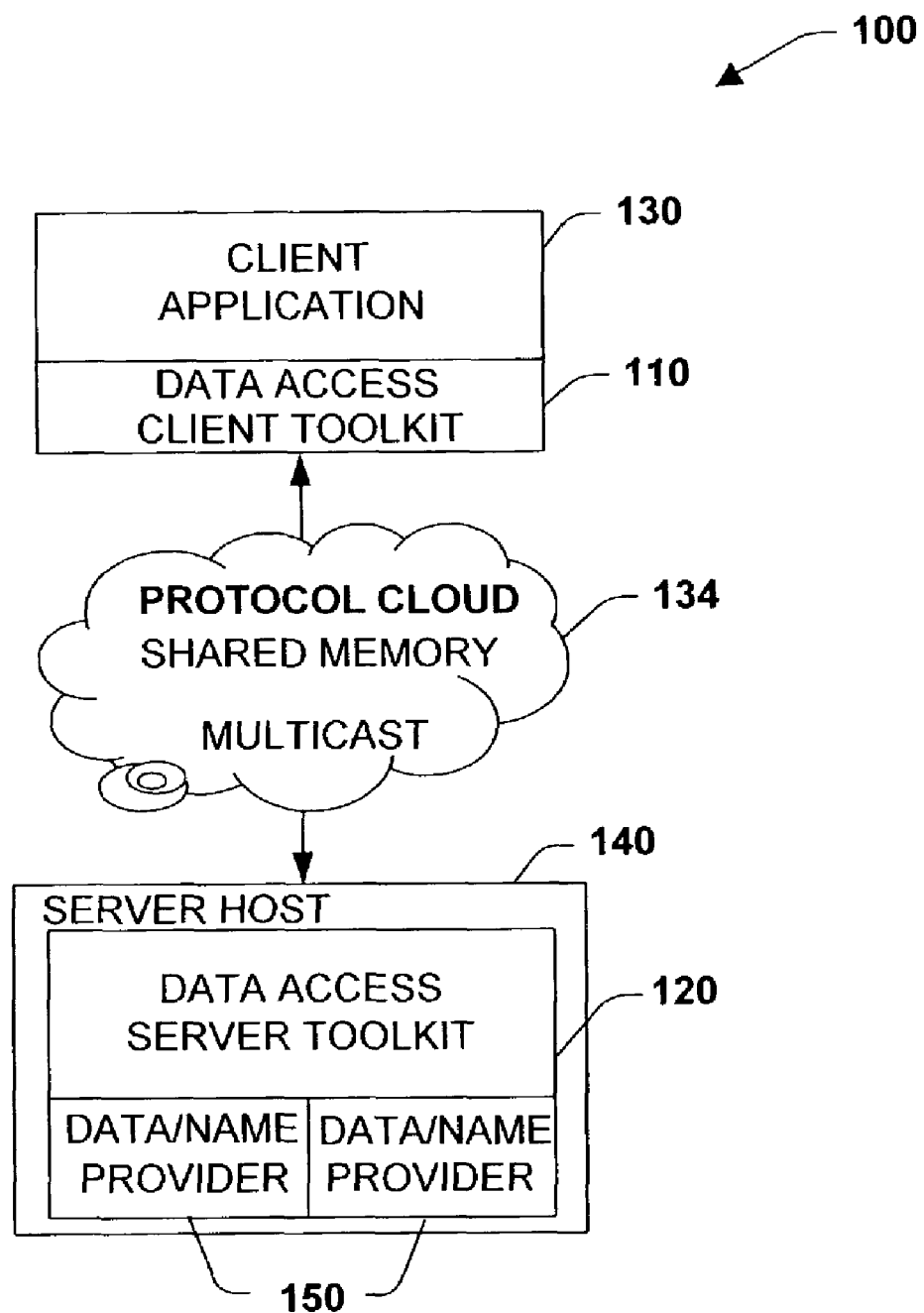
FIG. 2 is a block diagram illustrating a multi-protocol and toolkit architecture in accordance with an aspect of the present invention.

Referring now to FIG. 2, a multi-protocol and toolkit architecture 100 is illustrated in accordance with an aspect of the present invention. The architecture 100 provides data access services in an industrial controller environment and includes a Data Access (DA) Client Toolkit 110 and Data Access (DA) Server Toolkit 120. The DA Client Toolkit 110 can be configured as an in-process server that a client application 130 (e.g., OLE for Process Control (OPC)) connects to. The Client Toolkit 110 employs the Directory 14, to get a context of what data servers it can communicate with, including machine name and other information concerning protocols. In addition, the Client Toolkit 110 manages associated server connections, including disconnects and reconnection.

The Client application 130 retrieves an interface pointer to a server, object (not shown), and since the Client Toolkit is in-process with the client 130, it generally will not become invalid. Thus, fast failure detection of remote server applications can be achieved. When a connection failure is detected, for example, the client 130 can be notified by data items that report a fault or "bad" quality condition (e.g., flag set indicating quality). When a Reconnection is made, data can be received from the server and quality to the client will return to good.

It is noted that redundant server applications can also be facilitated by the present invention. For example, if a backup server has been configured, and when a server failure has been detected, the client toolkit 110 can switch it's connection from the primary server to the backup and start collecting data from the new data server. Redundancy options can include a Favor Primary or Stay with Current server condition and configuration setting. The Favor Primary condition is defined such that when the primary server comes back online, then it will become the new active server instance. The Stay with Current condition is defined such that the Client Toolkit 110 will stay with the currently active server until it fails and/or is forced to fail-over to the next connected server. It is further noted that Client and Server Toolkits 110 and 120 can utilize different protocols 134 to exchange information and data. These protocols can include OPC, Distributed Component Object Model (DCOM), Shared Memory, and/or IP Multicast, for example, and are described in more detail below.

Server Applications generally consist of a Host application 140, the DA Server Toolkit 120, and one or more Data/Name Provider pairs 150. The Host 140 can be a dynamic link library (DLL) or an executable, for example, and the executable can run as a standard application or as a service and can register the information such as OPC for the server. The Host application 140 can be employed to load other subsystems and/or handle additional configurations. It can also expose one or more server objects that aggregate in the objects of the Server Toolkit 120. In addition, the Server Toolkit 120 can be initialized with a list of Name Providers that the server supports. This list can be dynamic and can depend on configuration information that the Host 140 is initialized with. The Server Toolkit 120 can be an aggregatable object that exposes a plurality of Interfaces (e.g., OPC interfaces). For example, the interfaces can include OPC 1.0a and OPC 2.0 Specifications. Data and Name Providers 150 can be COM or other type objects (e.g., CORBA) that support the specified interfaces. Data Provider objects provide methods to add and remove items, to poll the items and put them into blocks. The blocks can enable the Data Provider to organize the items in a manner that facilitates retrieving data from the device. The Name Provider object provides methods to browse and resolve data items as well as handle item properties of associated tags.

Figure 3:
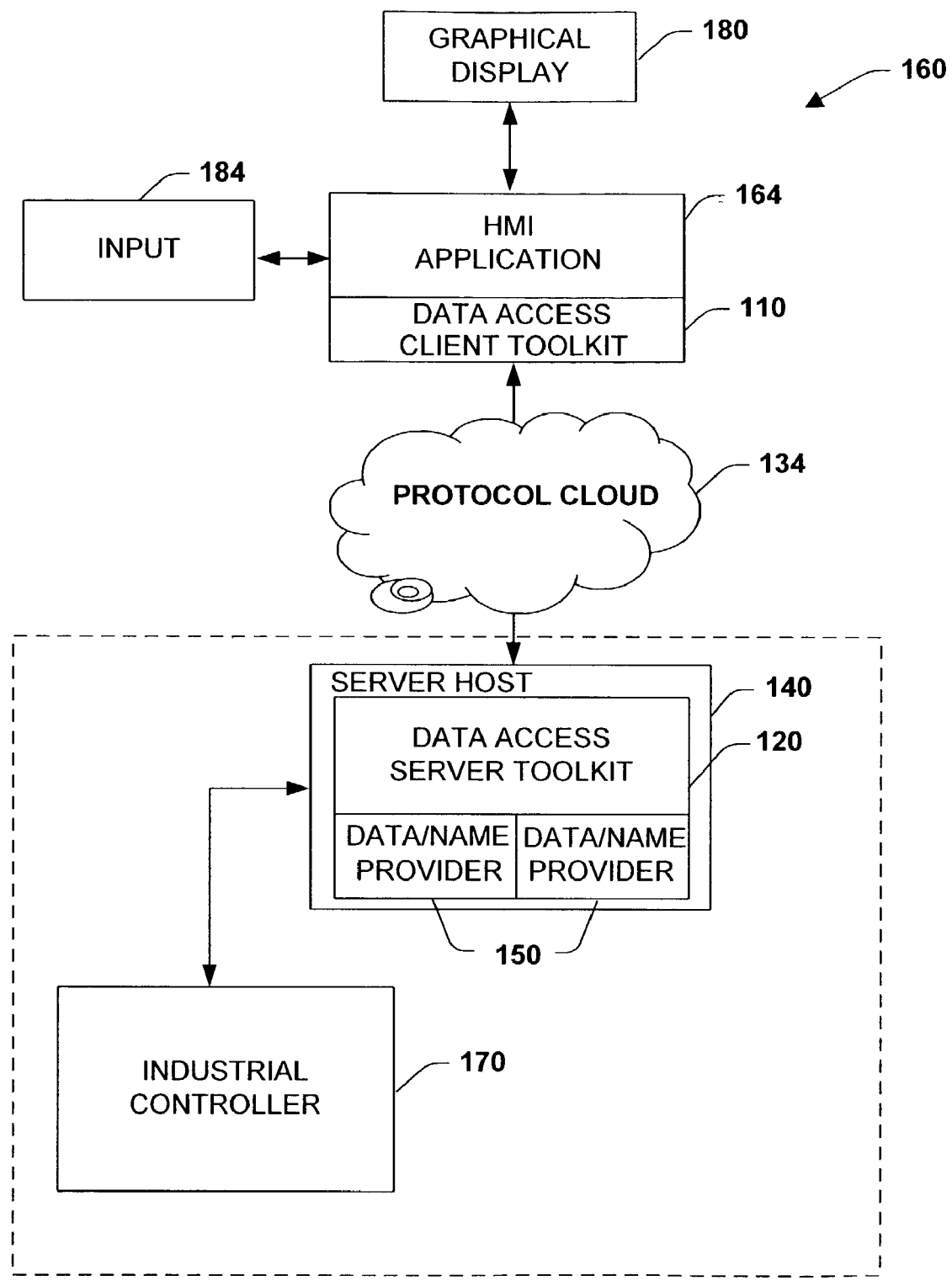
FIG. 3 is a block diagram illustrating an industrial controller and human machine interface employing a multi-protocol architecture in accordance with an aspect of the present invention.

Referring to FIG. 3, an industrial control system 160 is illustrated in accordance with an aspect of the present invention. The industrial control system 160 includes a Human and Machine Interface (HMI) application 164 that can communicate via the protocol cloud 134 to the server 140. The server 140 is operative to send and receive data to and from an industrial controller 170. It is noted that the host server 140, the data access server toolkit 120 and/or the data and name providers 150 can be remote from the industrial controller 170 such as over a network. Alternatively, the components 120, 140, and/or 150 can be integrated within the industrial controller 170 as a resident application or applications and can reside in a memory (not shown) in the controller.

The HMI application 164 generally includes an associated graphical display 180 to provide feedback and output data to a user regarding various aspects of interacting with the industrial controller 170. The display 180 can include display objects (e.g., icons, buttons, sliders, input boxes, selection options, menus; tabs and so forth) having multiple dimensions, shapes, colors, text, data and sounds to facilitate operations with the controller 170. The HMI 164 also includes a plurality of inputs 184 for adjusting and configuring one or more aspects of the present invention. This can include receiving user commands from a mouse, keyboard, speech input and/or other device to effect operations of the HMI 164.

Figure 4:
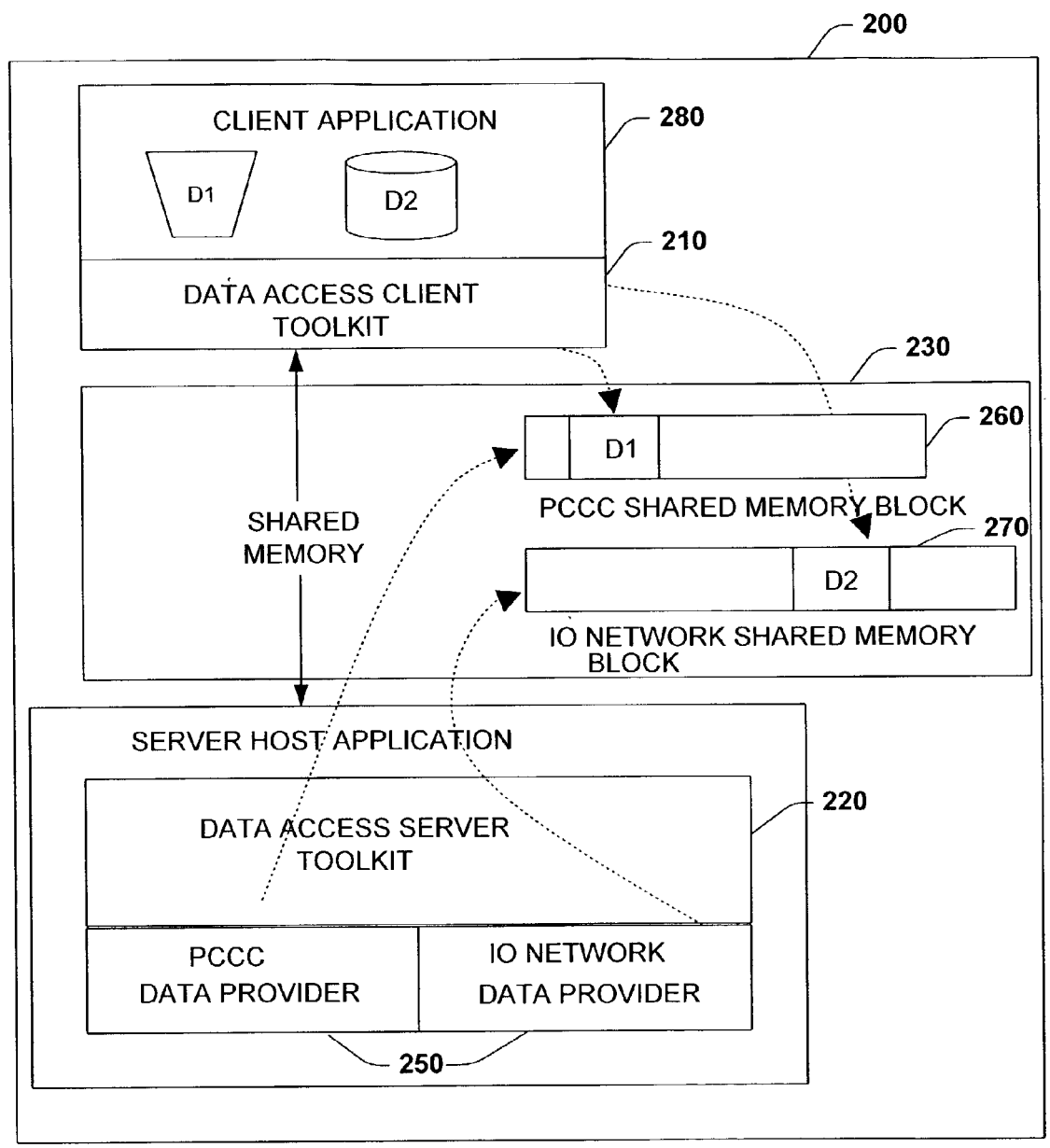
FIG. 4 is a schematic block diagram illustrating a standalone architecture in accordance with an aspect of the present invention.

Turning now to FIG. 4, a shared memory architecture 200 and protocol is illustrated in accordance with an aspect of the present invention. The protocol between a DA Client Toolkit 210 and a DA Server Toolkit 220 includes communications via a Shared Memory 230. It is noted that the shared memory can reside in a separate portion of memory from the client and server applications and/or can be associated with the client and server applications. Similarly, the protocol between the DA Server 220 and Data Providers 250 is also a shared memory mechanism. As the Data Providers 250 are updating data for a block of data, the data can be directed into a respective shared memory block that the DA Client Toolkit 210 also has access to. For example, data providers 250 include a PCCC provider and an I/O Network provider that update respective buffers 260 and 270 in the shared memory 250 that can then be accessed by the DA Client toolkit 210. When it is time for the DA Client Toolkit 210 to send formatted data back to a client application 280 (e.g., Graphics Display application), it employs the shared memory blocks 260 and 270 to retrieve a current data value. An advantage to the architecture 200 is that since the Data Providers 250 are modular, generally only the needed components are downloaded to a device, facilitating a smaller software footprint.

According to one aspect of the present invention, the blocks 250 and 260 can be employed to enable data to stay in raw format for as long as possible. In this manner, Data Providers 250 can process blocks of data, generally without processing individual items whenever data is polled or received. As items are added to the system 200, the Data Provider 250 will create blocks as necessary and will return block information back to the data provider including offsets and length of data. The Server Toolkit 220 will notify when to poll the blocks depending on what items are in the blocks and in which groups these are added. When the data is received for the block, the Data Provider 250 will lock the block and receive a pointer to memory location to copy the data into and then unlock it. The Server Toolkit 220 will then use this memory buffer 260 or 270 to send data for individual items back to the client application 280. It is to be appreciated that a plurality of data providers and shared memory buffers can be created, installed, and employed to exchange data between clients and servers. The memory buffers can be employed differently for different protocols utilized to communicate with the client 280. In a standard OPC Protocol, for example, the memory buffer can be utilized to pull a current value and fill in the appropriate structures or buffers. In the Shared Memory protocol, where the client and server are on the same machine, the memory buffers can be stored in a Windows Shared Memory or other platform memory, wherein a handle is then passed to the Client Toolkit 210 along with the information of offsets and length for respective data items. The Client Toolkit 210 can employ the Shared Memory 230 to build up data packets that it desires to send back to the client 280.

Figure 5:
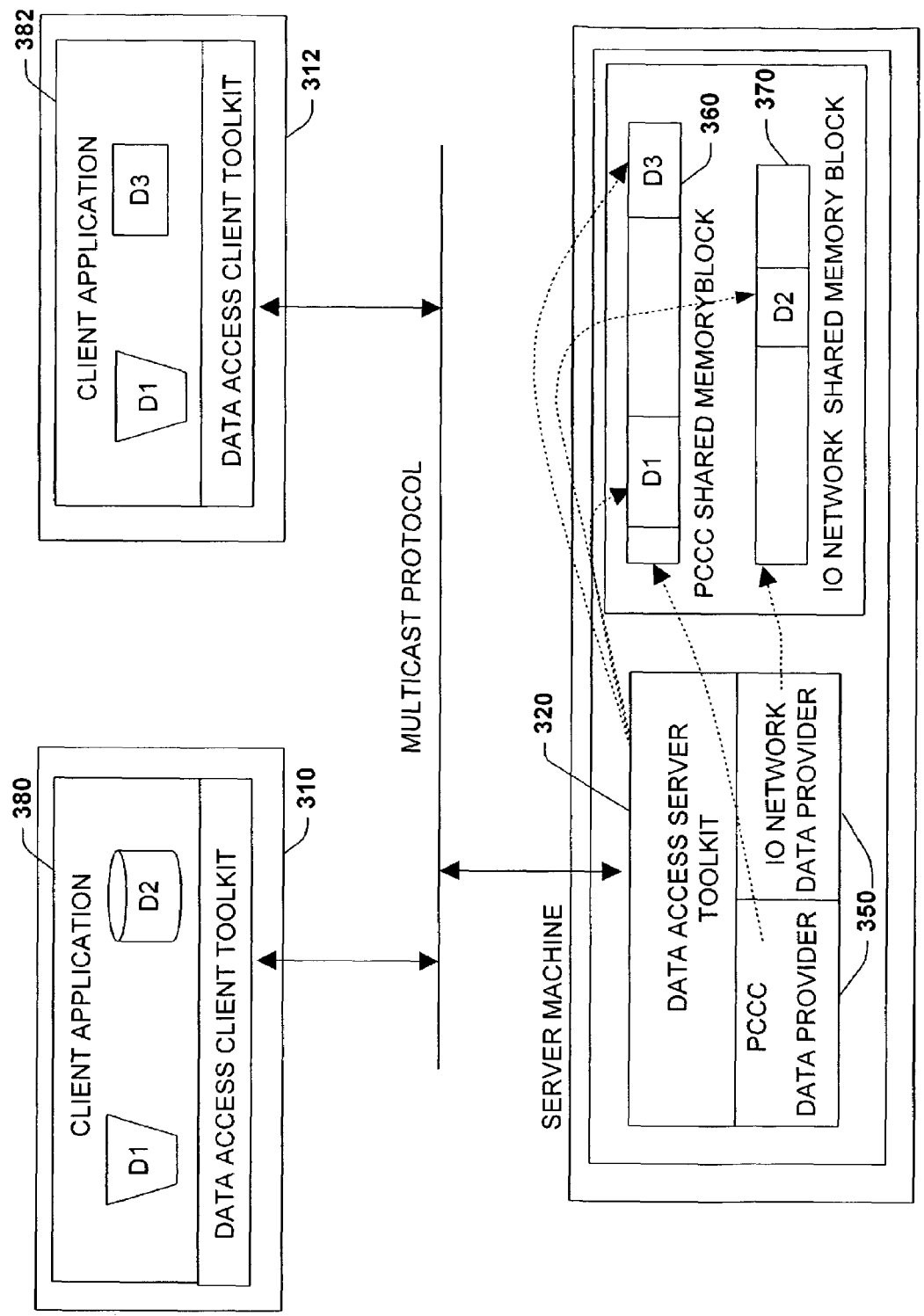
FIG. 5 is a diagram illustrating a distributed architecture in accordance with an aspect of the present invention.

FIG. 5 is a diagram illustrating a distributed architecture 300 in accordance with an aspect of the present invention. The protocol between DA Client Toolkits 310 and 312 and a DA Server Toolkit 320 can be Multicast, whereas the protocol between the DA Server toolkit 320 and the Data Providers 350 can a shared memory mechanism. It is to be appreciated that a plurality of similarly adapted clients and servers can be configured in accordance with the present invention. The Data Provider 350 can update data for a block of data at 360 and 370 in a shared memory block that is created by DA Server Toolkit 320. When it is time to send data to distributed client applications 380 and 382, the DA Server Toolkit 320 bundles change of state data and sends the changed data to the DA Client Toolkits 310 and 312 on the remote machines via a Multicast network transmission. Multicasting enables server applications to build data packets once and transmit the data multiple clients concurrently. When the DA Client Toolkits 310 and 312 receive the data, the toolkits parse through associated receive message buffers (not shown) to find data values that the client 380 and 382 has requested. The DA Client Toolkits then package the data in an OPC formatted message or other format and pass the data on to the respective client.

In the Multicast protocol, wherein the client and server are on different machines, the memory buffers 360 and 370 can be placed into packets and multicast out to the system. Any distributed client can pull the data off the wire and utilize it as needed. Multicasting data to multiple clients generally facilitates improved network bandwidth and server performance as more clients are added to the system. In addition, multicasting blocks of data facilitate improved network bandwidth.

FIGS. 6-10 illustrate methodologies to facilitate client and server interactions and data exchange in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
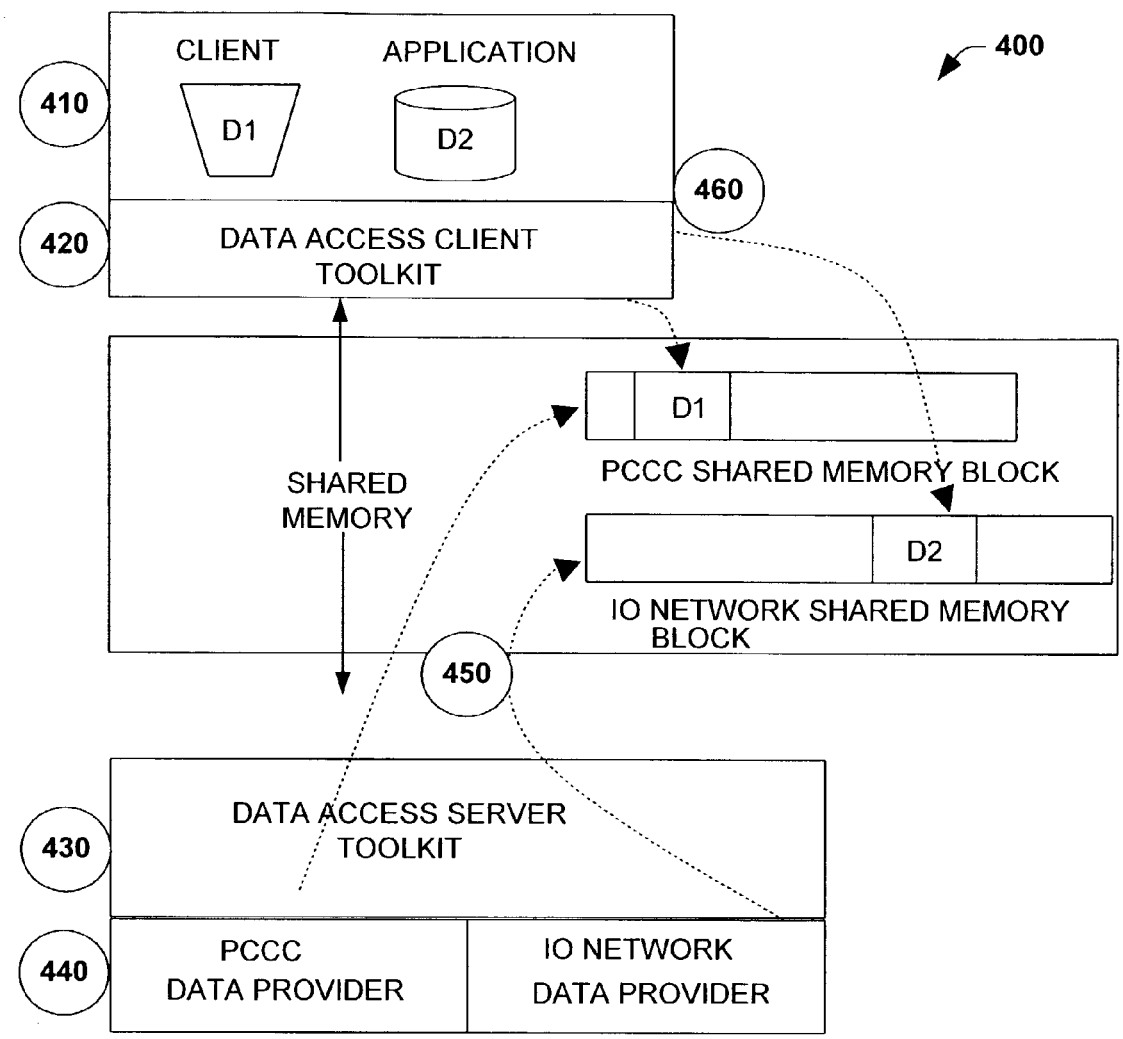
FIG. 6 is a system diagram illustrating a standalone process in accordance with an aspect of the present invention.
Figure 7:
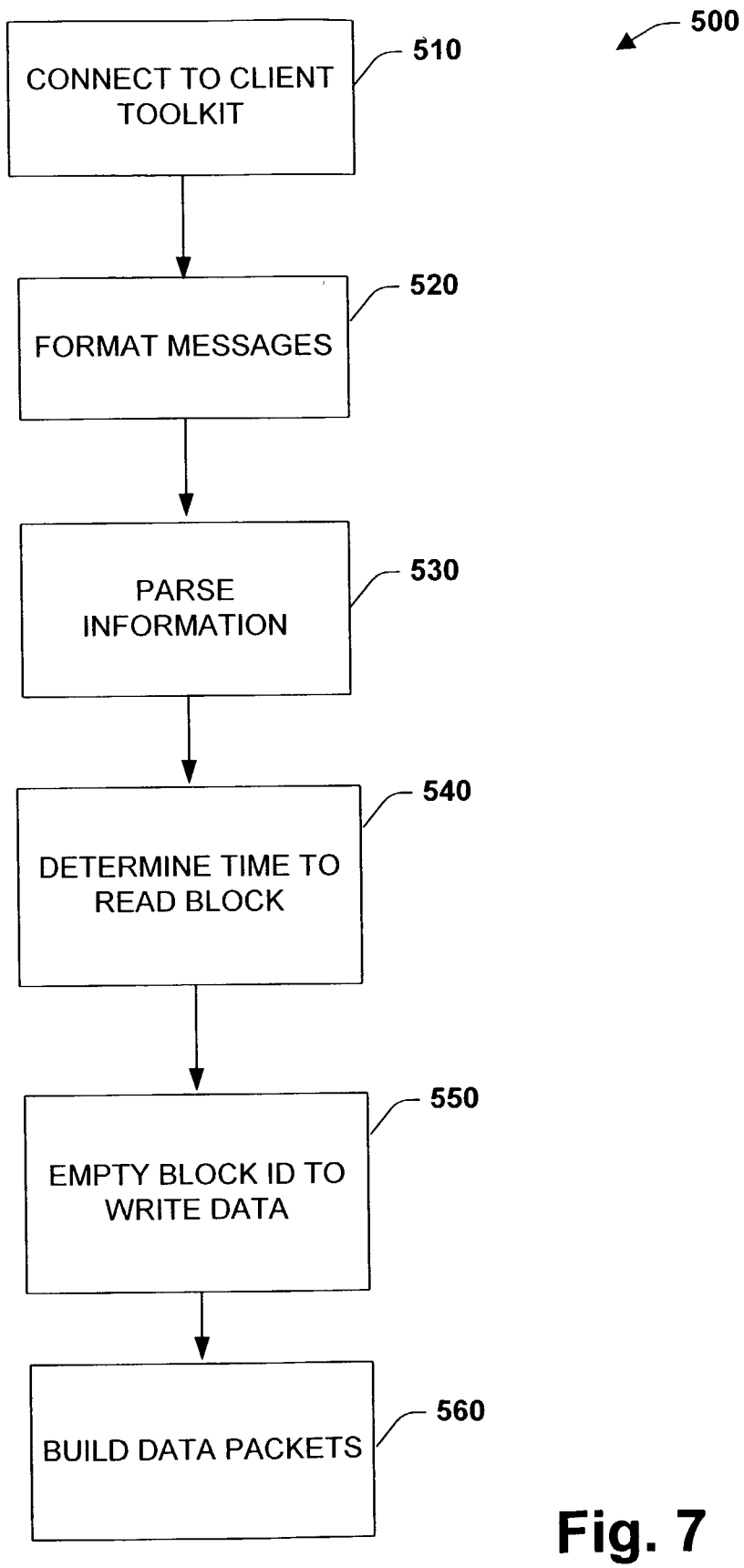
FIG. 7 is a flow diagram illustrating a dynamic standalone process in accordance with an aspect of the present invention.
Figure 8:
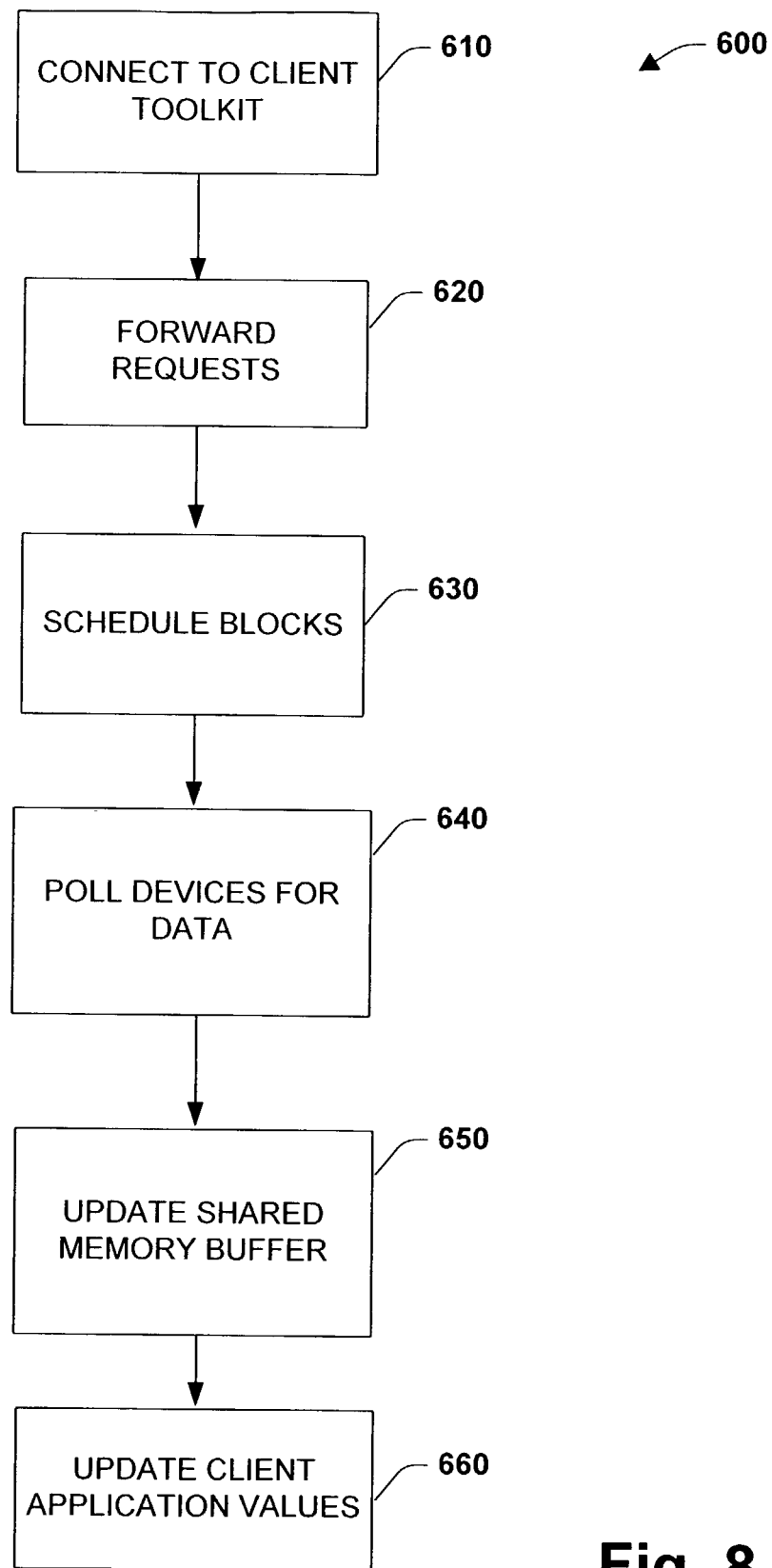
FIG. 8 is a flow diagram illustrating a static standalone process in accordance with an aspect of the present invention.

FIG. 6 is a system diagram 400 illustrating a standalone process employed in FIGS. 7 and 8 according to an aspect of the present invention. Reference numerals 410 through 460 depicted in FIG. 6 are correlated with reference numerals and associated process steps 510 through 560 in FIG. 7, and correlated with reference numerals 610 through 660 in FIG. 8.

Referring first to FIG. 7, a flow diagram 500 illustrates a dynamic standalone process in accordance with an aspect of the present invention. This process demonstrates the flow of information and data in a scenario wherein the client is dynamically adding and removing items via OPC or other type interfaces. At 510, a client application (e.g., Graphics display) connects to a DA Client Toolkit, employing OPC or other type interfaces, and adds group and items that are relevant for the current display screen or application. At 520, the DA Client Toolkit formats the required messages for adding groups and items and forwards the messages to a DA Server Toolkit. At 530, the DA Server Toolkit parses through the requested information, sets up internal structures, and passes the associated Data Provider the items that are valid for it's devices. The Data Provider will parse the item name and return back a block id, offset, size and a few other values. The block id can represent a handle to be employed for the scheduling of device read and updating the values back to the DA Server Toolkit. If the Data Provider can optimize the reads of data from the device, then it can utilize the same block id for multiple items.

At 540, the Server Toolkit determines when it is time to read an associated block, wherein the Data Provider is then notified. At 550, when the data is returned, the Data Provider uses that block id to write the data to the shared memory buffer that has been reserved for that block. At 560, when the DA Client Toolkit is requested to update to the client application, it uses the values in the shared memory buffers to build up OPC or other type data packets that is then provided to the client application.

Referring now to FIG. 8, a flow diagram 600 illustrates a static standalone process in accordance with an aspect of the present invention. This process illustrates the flow of information and data in a scenario wherein the client is building up configuration information at design time. Thus, there generally would need to be services available to save configuration information for a given project. Static Configuration can be provided to utilize OPC's notion of Public Groups, for example. A Design Station can be provided to create configuration files that contain information that respective systems generally need to bring tags online. This can include, but is not limited to, public group names, item ids, item handles, blocking id, and information to retrieve data from associated blocks, for example.

Proceeding to 610, a client application connects to a DA Client Toolkit employing OPC or other type interface, and then adds a public group that corresponds to a client data request or current display screen. At 620, the DA Client Toolkit then forwards the requests on to a DA Server Toolkit. At 630, the DA Server Toolkit begins scheduling blocks that are associated with tags that are in a specified group. At 640, a Data Provider then polls a device for the specified block of data. At 650, and upon receiving the data, the Data Provider updates the shared memory buffer for the respective block. At 660, employing item handles that were assigned in a configuration phase, the DA Client Toolkit accesses the shared memory buffers and updates the values at the client application.

Figure 9:
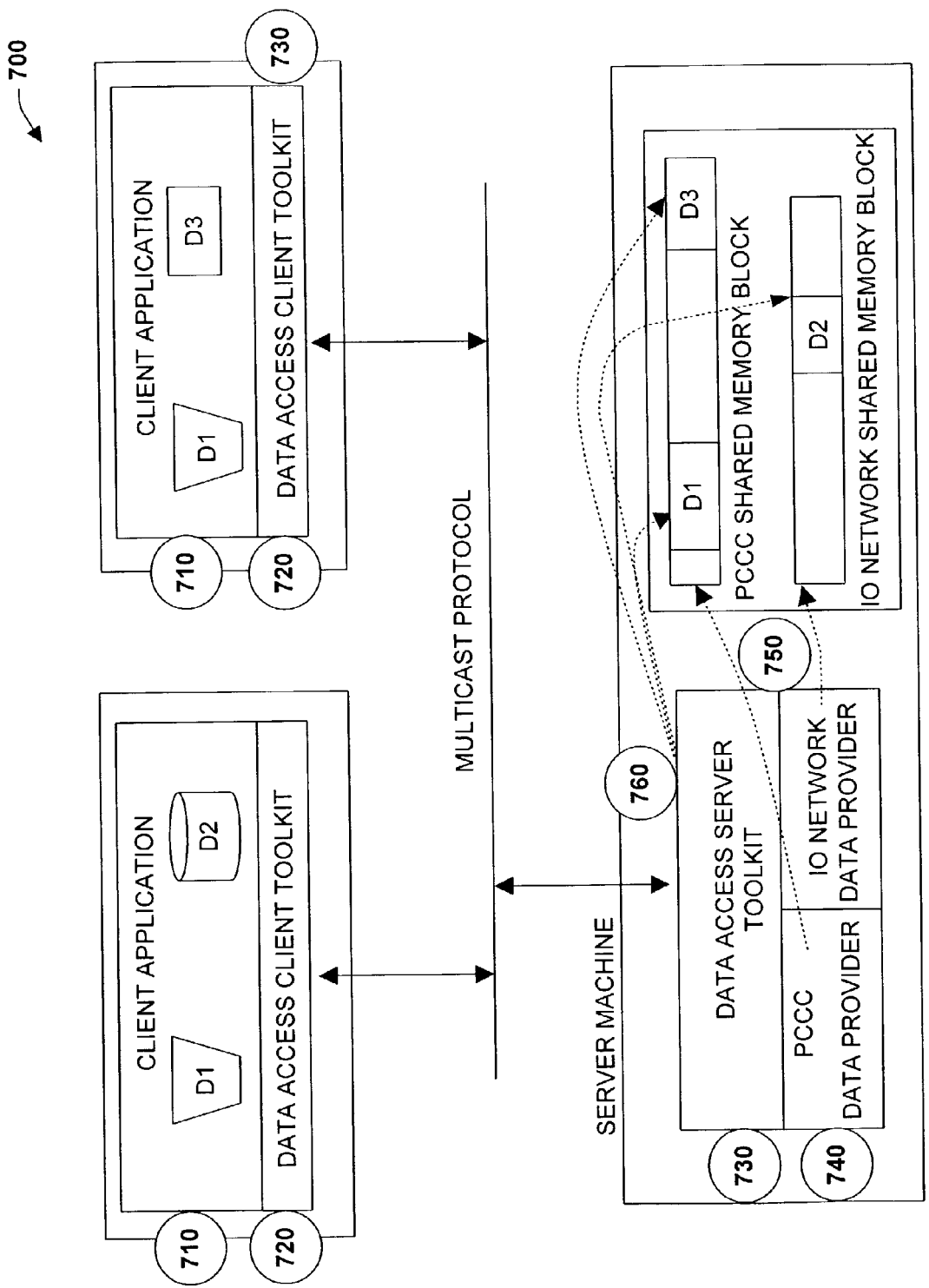
FIG. 9 is a system diagram illustrating a distributed process in accordance with an aspect of the present invention.

FIG. 9 is a system diagram 700 illustrating a distributed process in accordance with an aspect of the present invention. Reference numerals 710 through 770 depicted in FIG. 9 are correlated with reference numerals and associated process steps 810 through 870 depicted in FIG. 10.

Figure 10:
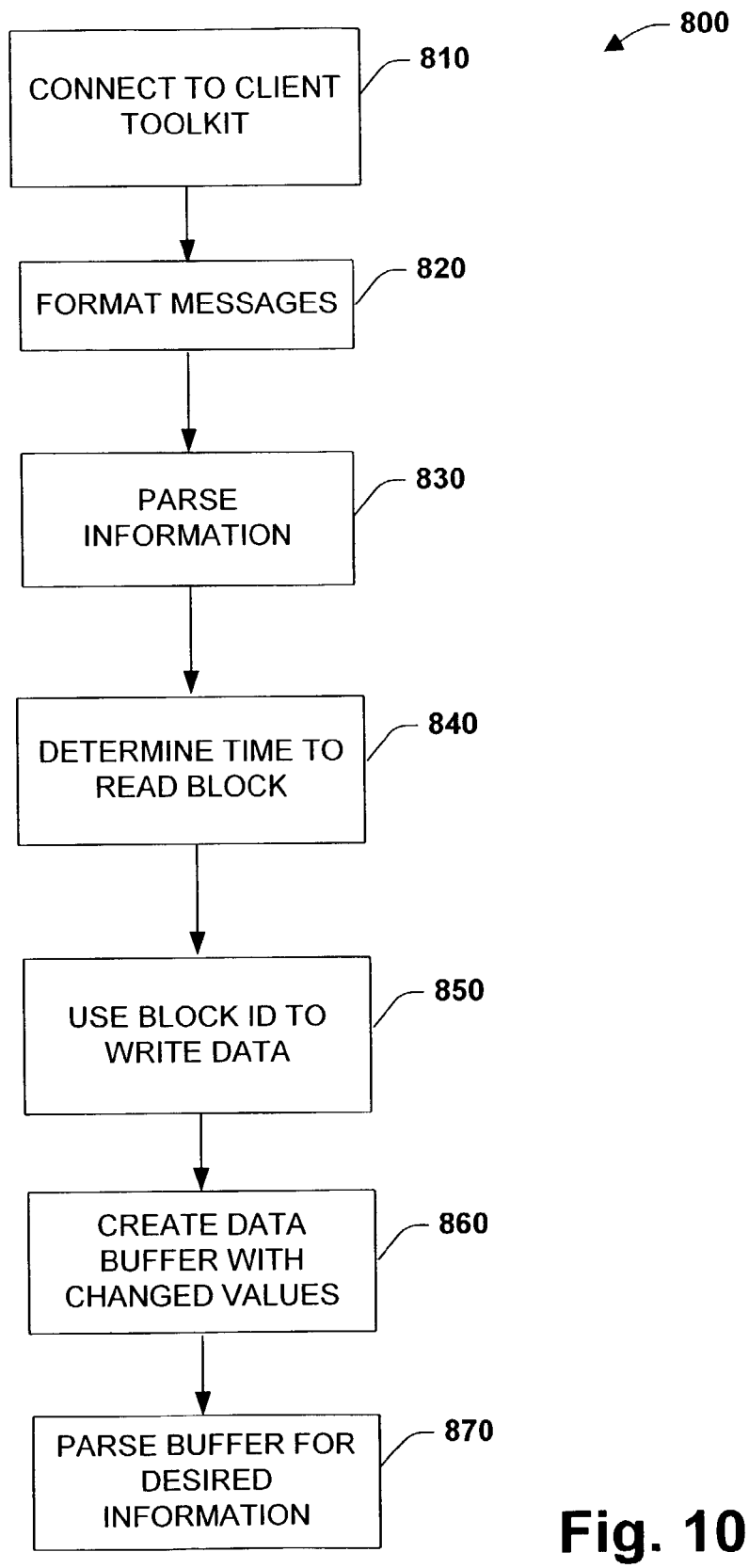
FIG. 10 is a flow diagram illustrating a distributed process in accordance with an aspect of the present invention.

Referring now to FIG. 10, a flow diagram 800 illustrates a distributed process in accordance with an aspect of the present invention. This process illustrates the flow of information and data in the scenario where there are distributed clients. At 810, a client application connects to a DA Client Toolkit employing OPC or other type interfaces, and adds a group and associated items that are relevant for the current application such as a display screen. At 820, the DA Client Toolkit formats network messages for adding groups and items and forwards the messages to a DA Server Toolkit via a Multicast protocol command. At 830, the Server Toolkit parses through the information, sets up it's internal structures and gives an associated Data Provider items that are valid for it's devices. The Data Provider then parses the item name and returns a block id, offset, size and other values. The block id represents a handle employed for scheduling of device read and updating the values back to the DA Server Toolkit. If the Data Provider can optimize the reads of data from the device, then it can utilize the same block id for multiple items.

At 840, the DA Server Toolkit determines that when it is time to read a block, the Data Provider is then notified. At 850, when the data returns, the Data Provider uses the associated block id to write the data to the shared memory buffer that has been reserved for the associated block. At 860, when the DA Server Toolkit needs to send data, it will create a data buffer with changed values (values that have changed data state since last read), in this case the data buffer would contain values for D1, D2 and D3. The Server Toolkit then Multicasts the buffer to clients that are adapted to receive information according to the multicast protocol. At 870, upon receiving the data buffer, the DA Client Toolkit for respective clients parses through an associated received message buffer to determine what items the client application has requested. The DA Client Toolkit would then forward these data values to the client applications.

The following are exemplary interfaces, definitions, and code fragments that represent one possible organization and/or structure to implement one or more of the above systems, components and/or methodologies. It is to be appreciated that various other implementations providing similar functionality are possible in accordance with the present invention.

DA Client Toolkit

The interface between the clients and the DA Client Toolkit component can be native OPC 1.0a and OPC 2.0 interfaces. Thus, clients who utilize these services can also be compatible with other third party OPC Servers. The DA Client Toolkit component can act as an in-process server working in the same COM apartment, if desired, in order for the interaction between the multiple components to be comparatively fast.

DA Client Toolkit to RNA-DA Server Toolkit

The interface between the DA Client Toolkit and the DA Server Toolkit can be a private interface that should generally only need to be supported by these two components.

RNA-DA Server Toolkit to Data Provider

The Data Provider can be an in-process COM Object, for example, that gets loaded employing standard COM creation, CoCreateInstance( ). The Data Provider can also support the IRNADADataProvider interface and employ the callback based IRNADADataServer interface to call back into the DA Server Toolkit. The Name Provider can also be an in-process COM Object.

interface IDaDataProvider : IUnknown // Interface Declaration

IDaDataProvider::AddItems( )

Employed to notify the Data Provider that new items are being added by a client application. Item count information specified in dwCount and pItemArray contains information for which items to add, including access path and item id. Output parameters, ppAddResults and ppErrors, contain information about the success of adding the specified items. Parameter ppAddResults contain information regarding which block, where, and how long the data is. It also contains data type and bit level information. The ppErrors parameter include HRESULT of the status of an item being added. If the item is added successfully, then the corresponding HRESULT in ppErrors is set to S_OK. If the item is invalid, this is set to an error code. The return code specifies the overall status of the call. If ppErrors contains all S_OK, then the return value is S_OK. If any item failed to be added then this is reflected in ppErrors and S_FALSE is returned from AddItems( ). If the call totally fails, then E_FAIL can be returned.

```
HRESULT AddItems(
  DWORD                    dwCount,         // Count of
items
  RNADA_PROVIDERITEM       * pItemArray,    // Array of
ProviderItem structures
  RNADA_PROVIDERITEMRESULT ** ppAddResults, // Pointer to
Array of Result structures
  HRESULT                  ** ppErrors      // Pointer to
Array of Error codes
  );
```

IDaDataProvider::SetActiveState( )

If Data Provider needs to track the active state of the items, then this method can be employed. The item handles are returned from the AddItems method. This is an optional method to allow the Data Provider to track which items are active and inactive. If the normal PollBlock( ) mechanism is sufficient for the Data Provider's data source, this method can be ignored and return S_OK;

```
HRESULT SetActiveState(
  DWORD         dwCount,        // Count of items
  BOOL          bActive,        // New active state for the items
  RNAHANDLE     * phDataProvider, // Data Provider specified handle
for this item
  HRESULT       ** ppErrors     // Poiner to array of error codes
  );
```

IDaDataProvider::RemoveItems( )

Utilized to notify the Data Provider that clients are done using these data items. The Data Provider can employ this information to re-optimize what data is being polled from the device.

```
HRESULT RemoveItems(
    DWORD          dwCount,        // Count of items
    RNAHANDLE      * phDataProvider, // Array of Data Provider specified
handle for this item
    HRESULT        ** ppErrors      // Pointer to array of error codes
);
```

IDaDataProvider::PollBlock( )

The Server Toolkit employs this method to notify the Data Provider that it should send specific packets to a device. The DA_POLLBLOCKFNFO structure contains the Data Provider handle of the poll block that is to be scanned. The structure also contains the offset and length of the data block associated with the active items that belong to this poll/memory block.

```
HRESULT PollBlock(
    DWORD            dwCount,         // Count of Poll Blocks
    RNADA_BLOCKINFO  * pPollBlockInfo, // Array of Poll Blocks
Info
    DWORD            dwTransactionId, // Identifier for this set
of polls
    DWORD            * pdwCancelId    // Data Provider
specified id to cancel this operation
);
```

IDaDataProvider::ReadItems( )

Utilized to notify the Data Provider that a client is reading data for a set of items. Use IDaDataServer::ReadComplete( ) to notify the toolkit that the read has completed. This method is called if the Data Provider has called the SetMode( ) method setting the "BlockRead" property to FALSE. ReadComplete( ) is called with the results, including the value of the data item.

```
HRESULT ReadItems(
    DWORD          dwCount,         // Count of items
    RNAHANDLE      * phDataProvider, // Array ofData Provider
specified handle for this item
    DWORD          dwTransactionId, // Trans id to be returned to
Server Toolkit upon completion
    DWORD          * pdwCancelId,   // Id returned from Data
Provider, used to cancel the operation
    HRESULT        ** ppErrors       // Pointer to array of error
codes
);
```

IDaDataProvider::WriteItems( )

Utilized to notify the Data Provider that a client is writing data to a set of items. Use IDaDataServer::WriteComplete( ) to notify the toolkit that the write has completed.

```
HRESULT WriteItems(
    DWORD          dwCount,         // Count of items
    RNAHANDLE      * phDataProvider, // Array of Data Provider specified
handle for this item
    VARIANT        * pItemValues,   // Array of Variants with the new
data values for the items
    DWORD          dwTransactionId, // Trans id to be returned to Server
Toolkit upon completion
    DWORD          * pdwCancelId,   // Id returned from Data Provider,
used to cancel the operation
    HRESULT        ** ppErrors       // Pointer to array of error codes
);
```

IDaDataProvider::Cancel( )

Utilized to notify the Data Provider that an outstanding Write has been cancelled. A dw TransactionId can be included for the Data Provider to verify that the cancel and transaction id match.

```
HRESULT Cancel (
    DWORD dwCancelId,     // Cancel id returned from Read or Write
calls
    DWORD dwTransactionId // Transaction id for this Read or Write call
);
```

IDaDataProvider::GetErrorString( )

Enables the Data Provider to provide server defined error values and strings for errors that can happen.

```
HRESULT GetErrorString(
    WORD wError,
    LCID dwLocale,
    LPWSTR * ppString
);
```

IDaDataProvider::GetDPInformation( )

Retrieves Data Provider information for diagnostic and informational purposes.

```
HRESULT GetDPInformation(
    RNADA_DPSTATUS ** ppDataProviderStatus
);
```

Data Server Callback Methods interface IDaDataServer : IUnknown

IdaDataServer::CreateBlock( )

This method is employed by the Data Provider to create a poll block. These are the blocks that the Data Provider is notified to scan from a device and have an allocated memory block to hold data.

```
HRESULT CreateBlock(
    RNAHANDLE   hBlock,       // Data Provider's handle to the
newly created block
    DWORD       dwBlockSize,  // Size of memory buffer to
associate with block
    RNAHANDLE   * hToolkitBlock // Server Toolkit provided handle
to refer to block
);
```

IDaDataServer::DestroyBlock( )

After items that are associated with a specific Block are removed, the Data Provider can call DestroyBlock( ) for the specified Block.

```
HRESULT DestroyBlock(
    RNAHANDLE hToolkitBlock   // Server Toolkit provided handle that
```

-continued

```
was returned from          // CreateBlock( ) method.
);
```

IDaDataServer::ChangeBlockSize( )
Data Provider can call LockBlock( ) before increasing the size of changing the block properties for items inside this block. When this operation is complete and valid data has been copied into the buffer, then an UnlockBlock( ) can be called.

```
HRESULT ChangeBlockSize(
    RNAHANDLE   hToolkitBlock,   // Server Toolkit provided handle referring to block
    DWORD       dwBlockSize      // New size of memory buffer for block
);
```

IDaDataServer::ChangeItemBlockProperties( )
Data Provider can call LockBlock( ) before increasing the size of changing the block properties for items inside this block. When this operation is complete and valid data has been copied into the buffer, then the UnlockBlock( ) can be called.

```
HRESULT ChangeItemBlockProperties(
    RNAHANDLE hToolkitItem,
    RNAHANDLE *phToolkitBlock,
    DWORD *pdwOffset,
    DWORD *pdwLength,
    DWORD *pdwBitMask,
    VARTYPE *pvtDataType,
    DWORD *pdwAccessRights
);
```

IDaDataServer::LockBlock( )
The Data Provider can employ this method to obtain a true pointer to the shared memory that is defined for the specified poll block. It also can synchronize access to the data memory.

```
HRESULT LockBlock(
    RNAHANDLE hToolkitBlock,
    BYTE ** pBuffer
);
```

IDaDataServer::UnLockBlock( )
Unlocks the block of memory that was locked previously with a call to LockBlock( ).

```
HRESULT UnLockBlock(
    RNAHANDLE hToolkitBlock
);
```

IDaDataServer::PollComplete( )
This methods enables notification of the completion of a poll block scan. This enables the Toolkit to update it's number of outstanding packets and to schedule another device scan if there are other poll blocks in the queue.

```
HRESULT PollComplete(
    RNAHANDLE    hToolkitBlock,
    DWORD        dwTransactionId,
```

-continued

```
    HRESULT      hrStatus,
    WORD         wQuality,
    FILETIME     *pTimeStamp
);
```

IDaDataServer::ReadComplete( )
Signals the completion a previous write transaction.

```
HRESULT ReadComplete(
    DWORD        dwTransactionId,
    HRESULT      hrStatus,
    DWORD        dwCount,
    RNAHANDLE    * phToolkit,
    VARIANT      * pVarData,
    WORD         * pwQuality,
    FILETIME     * pftTimeStamp,
    HRESULT      * phrErrors
);
```

IDaDataServer::WriteComplete( )
Signals completion a previous write transaction.

```
HRESULT WriteComplete(
    DWORD        dwTransactionId,
    HRESULT      hrStatus,
    DWORD        dwCount,
    RNAHANDLE    * phToolkit,
    HRESULT      * phrErrors
);
```

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system that facilitates data exchange between multiple and distributed control components, comprising the following components stored in memory and executed by a controller:
  a server application operative to exchange data with an industrial controller;
  a server component associated with the server application, the server component communicates via a plurality of protocols to facilitate exchange of the data, the server application dynamically selects a suitable protocol for data communications based upon a relationship or configuration between the server component node and the industrial controller node, wherein a relationship can be chosen from one of: shared interaction when the nodes are operating on a same machine, distributed interaction when multiple nodes are operating on similar machines in a same environment, or remote interaction when the nodes are operating remotely over a network; and
  a host component that exposes objects in the server component to a plurality of clients via service-specific interfaces and determines a local operating environment or remote operating environment, the objects employed to communicate with a client component over a shared memory protocol according to the local operating environment, a multicast protocol according to the remote operating environment, wherein in the shared memory protocol the client component accesses a shared memory in the objects to retrieve data and in the multicast protocol data is transmitted to multiple clients, the client component parses through the received data and accesses data that is relevant to the client component.

2. The system of claim 1, the plurality of protocols further comprising at least one of OLE for Process control (OPC) and Distributed Component Object Model (DCOM).

3. The system of claim 1, the server component is a data access server toolkit.

4. The system of claim 3, the client component further comprises a data access client toolkit to that exchanges data with the data access server toolkit.

5. The system of claim 4, the shared memory protocol further comprising at least one of a data and a name provider that is updated by the data access server toolkit, the contents of the at least one data and name provider periodically transferred to a shared memory buffer.

6. The system of claim 5, the shared memory buffer accessed by the data access client toolkit to provide data to a client application.

7. The system of claim 5, the shared memory buffer receiving at least one of PCCC information and I/O network information from the data access server toolkit.

8. The system of claim 4, the data access client toolkit is configured as an in-process server with a client application.

9. The system of claim 4, the data access client toolkit manages one or more server connections and adjusts a flag according to a connection status, the connection status including failure detection of the connection.

10. The system of claim 9, further comprising one or more redundant server connections, including at least one of a favor primary and a stay with current server condition configuration associated with the connections.

11. The system of claim 5, the data provider processes one or more memory blocks.

12. The system of claim 1, the multicast protocol further comprising updating a memory buffer via the server component and distributing the contents of the memory buffer to one or more clients via a network messaging command.

13. The system of claim 1, at least one of the server application, the server component, and the host component are integrated within the industrial controller.

14. The system of claim 6, the client application is a Human Machine Interface.

15. A method to facilitate data exchange in an industrial controller environment, comprising:
employing a processor to execute computer executable instructions stored in memory to perform the following steps:
adapting a server component in an industrial controller to exchange data with a client component;
determining a local configuration and a distributed configuration to exchange the data, wherein in the local configuration the server component and the client component operate on a same machine, in the distributed configuration a plurality of client components interact with the server component;
dynamically selecting a protocol for data communications, based upon the determined configuration;
directing data according to a shared memory protocol in the local configuration, wherein the data received from the industrial controller is directed into a shared memory buffer that the client component has access to, the client component accesses the shared memory buffer to retrieve the data; and
directing data according to a multicast protocol in the distributed configuration, wherein the data is transmitted to the plurality of client components and each one of the client components parses through the received data and accesses data that is relevant to the client component.

16. The method of claim 15, further comprising configuring the client component as an in-process server that communicates with a client application.

17. The method of claim 15, further comprising dynamically adding and removing items via an OLE for Process Control (OPC) interface.

18. The method of claim 17, further comprising employing the OPC interface to add groups and items that are relevant for a current display screen application.

19. The method of claim 18, further comprising formatting messages for adding the groups and items.

20. The method of claim 18, further comprising:
parsing through requested information;
setting up internal structures; and
passing items that are valid for one or more devices.

21. The method of claim 20, further comprising returning at least one of a block id, an offset, and a size.

22. The method of claim 21, the block id representing a handle to be employed for scheduling a device read and updating the values.

23. The method of claim 22, further comprising:
determining when it is time to read a data block; and
employing the block id to write the data block to a shared memory buffer that has been reserved for that block.

24. The method of claim 15, further comprising adding a public group that corresponds to at least one of a client data request and a current display screen.

25. The method of claim 24, further comprising employing item handles that are assigned in a configuration phase.

26. The method of claim 15, further comprising formatting network messages for adding groups and items via the multicast protocol.

27. The method of claim 26, further comprising transmitting data values via the multicast protocol according to a change of state of the data values from a previous state.

28. The method of claim 27, further comprising parsing a received message buffer to determine what data values have been requested.

29. An industrial control system that facilitates data exchange between multiple and distributed control components, comprising the following components stored in memory and executed by a controller:
means for exchanging data between a client application and an industrial controller;
means for dynamically selecting a suitable protocol for data communications based upon a relationship or configuration between the client application and the industrial controller;
means for determining a local configuration when both operate on the same machine and a distributed configuration when multiple client applications interact with the industrial controller, to exchange data;
means for directing data according to a shared memory protocol in the local configuration, wherein the data from the industrial controller is directed into a shared memory buffer, the client component accesses the shared memory buffer to retrieve the data; and means for directing data according to a multicast protocol in the distributed configuration, wherein the data from the industrial controller is transmitted to the multiple clients, the client application parses through the received data and accesses data that is relevant to the client application.

30. An industrial control system that facilitates data exchange between multiple and distributed control components, comprising the following components stored in memory and executed by a controller:
- a server application operative to exchange data with an industrial controller, the server application dynamically selects a suitable protocol for data communications based upon a relationship or configuration between the industrial controller and the server application;
- a server component associated with the server application, the server component determines a local configuration environment when the server component and the industrial controller are resident on a same machine and a remote configuration environment when the server component and the industrial controller operate remotely over a network; and
- a host component that exposes objects in the server component, the objects employed to communicate with a client component over a shared memory protocol according to the local configuration environment, and over a multicast protocol according to the remote configuration environment, wherein in the multicast protocol the data received form the industrial controller is directed into a memory buffer and is transmitted to multiple clients, the client component parses through the received data and accesses data relevant to a client application.

31. An industrial control system that facilitates data exchange between multiple and distributed control components, comprising the following components stored in memory and executed by a controller:
- a client application operative to exchange data with an industrial controller, the client application dynamically selects a suitable protocol for data communications based upon a relationship or configuration between the industrial controller and the client application;
- a client component associated with the client application, the client component determines a local operating environment when the industrial controller and the client component operate on a same machine and
- a remote operating environment when the industrial controller and the client component operate remotely over a network; and a connection component operative with the client component to select a shared memory protocol according to the local operating environment and a multicast protocol according to a remote operating environment, wherein in the shared memory protocol data received from the industrial controller is directed into a shared memory buffer, the client component accesses the shared memory buffer to retrieve the data and in the multicast protocol the data received from the industrial controller is transmitted to multiple clients and the client component parses through the received data to access data that is relevant to the client application.

32. The industrial control system of claim 31, the client application is a Human Machine Interface (HMI), the HMI, the HMI having a graphical display output and one or more inputs to interact with the industrial controller.

* * * * *

UNITED STATES PATENT AND TRADEMARK OFFICE
CERTIFICATE OF CORRECTION

PATENT NO. : 7,599,999 B1  Page 1 of 1
APPLICATION NO. : 10/152513
DATED : October 6, 2009
INVENTOR(S) : Armstrong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Twenty-eighth Day of September, 2010

David J. Kappos
*Director of the United States Patent and Trademark Office*